United States Patent
Lin et al.

(10) Patent No.: US 12,074,739 B1
(45) Date of Patent: Aug. 27, 2024

(54) CONTINUOUS TIME LINEAR EQUALIZER OF SINGLE-ENDED SIGNAL WITH INPUT COUPLING CAPACITOR

(71) Applicant: MACRONIX INTERNATIONAL CO., LTD., Hsinchu (TW)

(72) Inventors: Jian-Syu Lin, Chiayi (TW); Shang-Chi Yang, Changhua (TW); Tung-Yu Li, Taoyuan (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 20 days.

(21) Appl. No.: 18/111,793

(22) Filed: Feb. 20, 2023

(51) Int. Cl.
*H04L 25/03* (2006.01)

(52) U.S. Cl.
CPC .............................. *H04L 25/03885* (2013.01)

(58) Field of Classification Search
CPC .. H04B 1/123; H04B 1/12; H04B 3/14; H04L 25/03885; H03K 17/122; H03K 17/6874
See application file for complete search history.

(56) References Cited

U.S. PATENT DOCUMENTS

| | | | | |
|---|---|---|---|---|
| 9,735,989 B1* | 8/2017 | Xie | ..................... | H03F 3/45201 |
| 9,806,915 B1* | 10/2017 | Elzeftawi | ............. | H03G 3/3036 |
| 10,263,815 B1* | 4/2019 | Geary | ............... | H04L 25/03885 |
| 2021/0058276 A1* | 2/2021 | Ahmadi | ............ | H04L 25/03878 |
| 2023/0268896 A1* | 8/2023 | Fazli Yeknami | ........ | H03F 1/083 330/250 |
| 2024/0056075 A1* | 2/2024 | She | ........................ | H04B 1/123 |

\* cited by examiner

*Primary Examiner* — David S Huang
(74) *Attorney, Agent, or Firm* — Andrew L. Dunlap; Haynes Beffel & Wolfeld LLP

(57) ABSTRACT

A continuous time linear equalizer (CTLE) circuit is provided. The CTLE circuit can include a differential pair of first and second transistors, the first and second transistors having drains connected through first and second drain resistors to a drain-side supply voltage node, and sources connected together by a source resistor and connected to one or more current sources, the first transistor in the differential pair having a gate connected to a reference voltage, and the second transistor in the differential pair having a gate connected to an input voltage, the drains of the first and second transistors providing a differential pair of signals as an output voltage, a first coupling capacitor connected between the source of the first transistor and the input voltage, and a second coupling capacitor connected to the source of the second transistor.

20 Claims, 13 Drawing Sheets

CONTINUOUS TIME LINEAR EQUALIZER OF SINGLE-ENDED SIGNAL WITH INPUT COUPLING CAPACITOR

BACKGROUND

Field

The technology disclosed relates to improving signals that have suffered channel loss. In particular, the technology disclosed relates to implementing a continuous time linear equalizer on a single-ended signal to compensate for channel loss and also relates to implementing an input buffer on a single-ended signal to compensate for channel loss.

Description of Related Art

Integrated circuits are often configured to receive high-speed data signals, such as double-data-rate DDR signals exceeding gigabits per second. For example, a high-speed receiver can be connected to an input/output pin on an integrated circuit, which is coupled to a transmission line for communication of data among chips.

As the data rates become higher, the pulse width of the input signals becomes smaller (e.g., pulse widths in the hundreds of picoseconds or less). The pulse width is a very important characteristic of some data signals, such as DDR signals where both the rising and falling edges are sensed.

FIG. 1 provides an illustration 100 of an ideal input 102 that has a pulse width of 300 picosecond (ps). As mentioned above, the ideal input 102 could be an ideal signal connected to an output pin on an integrated circuit. However, as the ideal input 102 is provided to a circuit 103, channel loss 104 can cause the pulse width of the ideal input 102 to change from 300 ps to 200 ps. This channel loss is not ideal. A conventional continuous time linear equalizer (CTLE) circuit 106 can be implemented to correct for the channel loss and provide a much cleaner pulse width signal that has a 300 ps pulse width, which matches the ideal input 102. However, conventional CTLE circuits 106 have a problem in that the AC gain that can be provided is limited by the DC gain that can be achieved by the circuit. Therefore, it is desirable to provide a CTLE circuit (or input buffer) that is suitable for use in integrated circuits, which is operable at high speeds, with low distortion and that can provide an AC gain that is not limited by the DC gain.

SUMMARY

A continuous time linear equalizer (CTLE) circuit is described. The CTLE circuit a differential pair of first and second transistors, the first and second transistors having drains connected through first and second drain resistors to a drain-side supply voltage node, and sources connected together by a source resistor and connected to one or more current sources, the first transistor in the differential pair having a gate connected to a reference voltage, and the second transistor in the differential pair having a gate connected to an input voltage, the drains of the first and second transistors providing a differential pair of signals as an output voltage. The CTLE circuit further includes a first coupling capacitor connected between the source of the first transistor and the input voltage, and a second coupling capacitor connected to the source of the second transistor.

According to an embodiment, the second coupling capacitor can be connected between the source of the second transistor and ground.

According to a further embodiment, the CTLE circuit can further comprise a first drain-side capacitor connected between the drain of the first transistor and ground.

In another embodiment, the CTLE circuit can include a second drain-side capacitor connected between the drain of the second transistor and ground.

In an embodiment, a capacitance value of the first drain-side capacitor can be the same as or similar to a capacitance value of the second drain-side capacitor.

In a further embodiment, a capacitance value of the first coupling capacitor can be the same as or similar to a capacitance value of the second coupling capacitor.

According to another embodiment, the source of the first transistor can be connected to a first current source providing a first biasing current.

According to an embodiment, the source of the second transistor can be connected to a second current source providing a second biasing current that is the same as or different from the first biasing current.

In a further embodiment, a first differential output voltage of the differential pair is provided from the drain of the first transistor.

In another embodiment a second differential output voltage of the differential pair can be provided from the drain of the second transistor and the first differential output voltage can be a negative voltage component of the differential pair and the second differential output voltage can be a positive voltage component of the differential pair.

According to an embodiment, when the input voltage surpasses a frequency threshold, the first transistor can operate in a common gate mode and the first differential output voltage can provide an alternating current (AC) gain that is greater than a direct current (DC) gain of the CTLE circuit.

According to a further embodiment, the DC gain can be determined by setting a value of the source resistor to 0 ohms.

According to another embodiment, the amplifier architecture of the CTLE circuit can be used in operational amplifiers, such as a two-stage operational amplifier and a fold-cascade operational amplifier.

In a further embodiment, the first and second coupling capacitors can be one of a metal-oxide-semiconductor capacitor (MOSCAP), a metal-insulator-metal capacitor (MIMCAP) and a multi-layer ceramic capacitor (MLCC).

In another embodiment, a memory device is provided to include the above-described CTLE circuit as a receiver circuit.

According to an embodiment, the memory can be one of static random access memory (SRAM), NAND flash memory, NOR flash memory, resistive random access memory (RRAM), magnetoresistive random access memory (MRAM) and phase change random access memory (PCRAM).

According to a further embodiment, an input buffer circuit is provided. The input buffer circuit can include a differential pair of first and second transistors, the first and second transistors having drains connected through first and second drain resistors to a drain-side supply voltage node, and sources connected to a current source, the first transistor in the differential pair having a gate connected to a reference voltage, and the second transistor in the differential pair having a gate connected to an input voltage, and a coupling capacitor connected between the source of the second transistor and the input voltage.

In an embodiment, the input buffer circuit can further include a first drain-side capacitor connected between the drain of the first transistor and ground and a second drain-side capacitor connected between the drain of the second transistor and ground.

In another embodiment, in the input buffer circuit, a capacitance value of the first drain-side capacitor can be the same as or similar to a capacitance value of the second drain-side capacitor.

Other aspects and advantages of the present invention can be seen on review of the drawings, the detailed description and the claims, which follow.

DETAILED DESCRIPTION

A detailed description of embodiments of the present invention is provided with reference to the FIGS. 1 to 14.

Figure 1:
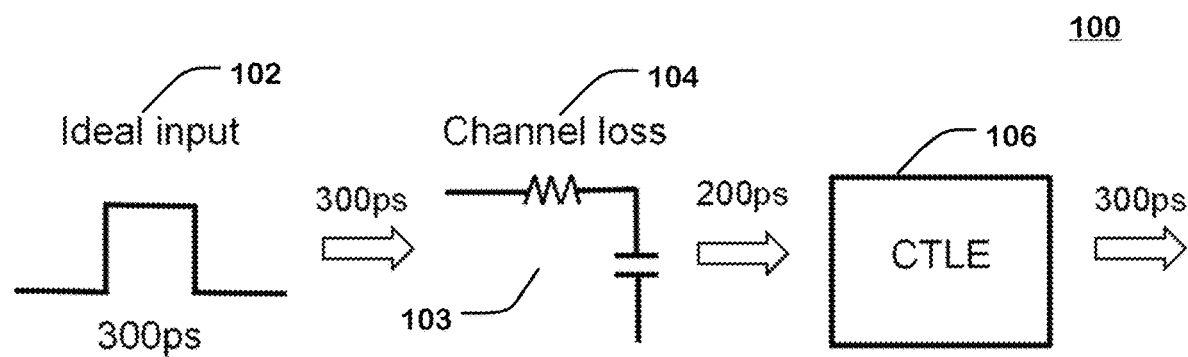
FIG. 1 illustrates implementation of a conventional continuous time linear equalizer (CTLE) to account for channel loss.
Figure 2:
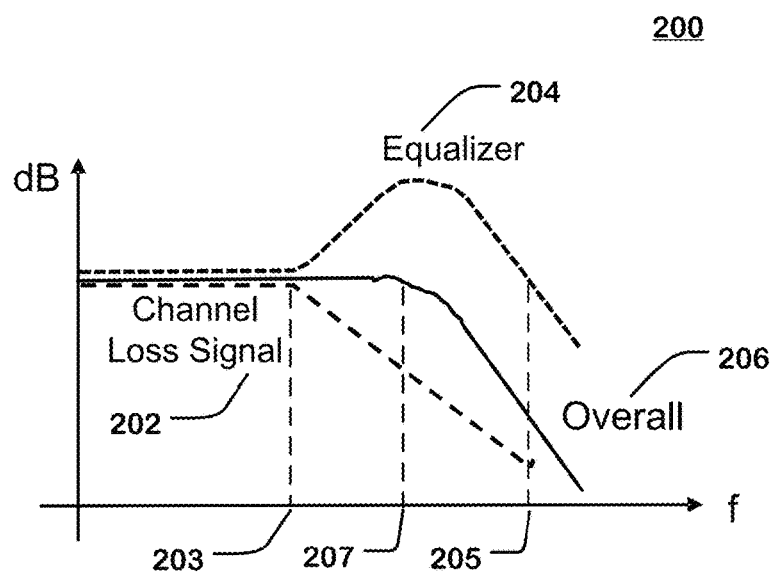
FIG. 2 is a dB (gain) vs. frequency diagram illustrating implementation of a CTLE to account for channel loss.

FIG. 2 is a dB (gain) vs. frequency diagram illustrating implementation of a CTLE to account for channel loss.

Specifically, FIG. 2 illustrates a dB (gain) vs. frequency diagram 200, with dB gain on the y-axis and frequency on the x-axis. As illustrated, channel loss 202 can begin at a certain frequency 203 when a signal is transmitted and/or received from/by circuitry. In this example, the circuitry causing the channel loss 202 is essentially acting as a low-pass filter. Specifically, after frequency 203 the dB gain of the channel loss signal 202 drastically decreases. The diagram 200 also illustrates a frequency response 204 of an equalizer, such as an CTLE. As illustrated, the frequency response 204 of the equalizer actually further amplifies a signal between frequency 203 and frequency 205. As further illustrated in the diagram 200, by applying the equalizer to the channel loss signal 202, the overall 206 output can be improved, such that dB loss does not appear until around frequency 207.

Figure 3:
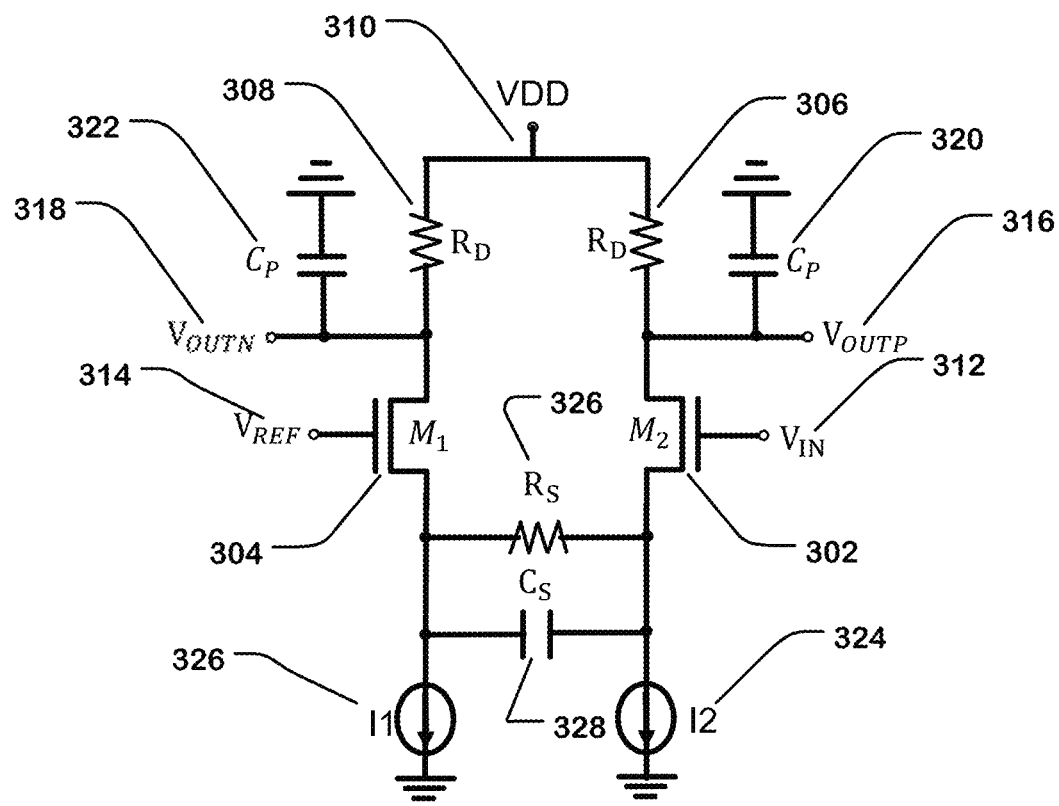
FIG. 3 is a circuit diagram of an example of a conventional CTLE circuit.

FIG. 3 is a circuit diagram of an example of a conventional CTLE circuit.

Specifically, FIG. 3 illustrates a conventional CTLE circuit 300 that can be used to compensate for channel loss. The conventional CTLE circuit 300 includes a differential pair of transistors, including a first $M_1$ transistor 304 and a second $M_2$ transistor 302. The first $M_1$ transistor 304 and the second $M_2$ transistor 302 are illustrated as MOSFET n-channel transistors. However, they can also be other types of transistors such as MOSFET p-channel transistors, JFET n- or p-channel transistors or any other type of transistors known to those skilled in the art.

As illustrated, a drain of the first $M_1$ transistor 304 is connected to a drain resistor $R_D$ 308. In a similar manner, a drain of the second $M_2$ transistor 302 is connected to a drain resistor $R_D$ 306. Typically, the drain resistor $R_D$ 308 and the drain resistor $R_D$ 306 have a same resistance value, but they can be different from one another. Both the drain resistor $R_D$ 308 and the drain resistor $R_D$ 306 are connected to a drain-side supply voltage node 310 that supplies a voltage of VDD.

A gate of the second $M_2$ transistor 302 is connected to $V_{IN}$ 312, which is a (single ended) voltage input signal (or input voltage) for which continuous time liner equalization is to be applied by the CTLE circuit 300. As an example, the input voltage signal can have values ranging from tens of millivolts (mVs) to hundreds of mVs at frequencies ranging from 1 gigahertz (GHz) to 10 GHz (although lower frequency operations can be common). A gate of the first $M_1$ transistor 304 is connected to $V_{REF}$ 314, which is a reference voltage. In an example, $V_{REF}$ 314 can have different values depending on whether a center tapped termination (CTT) or a low tapped termination (LTT) is implemented. More specifically, for example, for a CTT implementation, $V_{REF}$ 314 can be the power supply voltage used by the circuit (VCCQ) divided by 2 and for an LTT implementation, $V_{REF}$ 314 can be VCCQ divided by 3.

The differential pair of transistors can provide a differential output signal (output voltage) including $V_{OUTP}$ 316, which can be a positive portion of the differential output signal and including $V_{OUTN}$ 318, which can be a negative portion of the differential output signal. Therefore, this conventional CTLE circuit 300 provides a differential output signal (output voltage) from a single-ended voltage input signal (voltage input) to compensate for channel loss. $V_{OUTP}$ 316 is connected to the drain of the $M_2$ transistor 302 (between the drain resistor $R_D$ 306 and the drain of the $M_2$ transistor 302).

A capacitor $C_P$ 320 is also connected between the drain of the $M_2$ transistor 302 and ground. Similarly, $V_{OUTN}$ 318 is connected to the drain of the $M_1$ transistor 304 (between the drain resistor $R_D$ 308 and the drain of the $M_1$ transistor 304). A capacitor $C_P$ 322 is also connected between the drain of the $M_1$ transistor 304 and ground.

A current I2 324, such as a biasing current is applied to a source of the M$_2$ transistor 302 and a current I1 326, such as a biasing current is applied to a source of the M$_1$ transistor 304. The sources of both the M$_1$ transistor 304 and the M$_2$ transistor 302 are connected to a source resistor R$_S$ 326 and a source capacitor C$_S$ 328, which are arranged in parallel. The values of source resistor R$_S$ 326 and a source capacitor C$_S$ 328 can be used to determine/set a zero frequency.

Alternatively, the conventional CTLE circuit 300 can receive a differential input, such that the gate of transistor M$_1$ transistor 304 receives one portion of a differential input signal, as opposed to V$_{REF}$.

Characteristics and the transfer function of the conventional CTLE circuit 300 are defined as follows:

$$H(s) = \frac{g_m}{C_p} \frac{s + \frac{1}{R_S C_S}}{\left(s + \frac{1 + \frac{g_m R_S}{2}}{R_S C_S}\right)\left(s + \frac{1}{R_D C_p}\right)},$$

where g$_m$ represents the known gain of the M$_1$ transistor 304 and the M$_2$ transistor 302.

Further, $$\omega_z = \frac{1}{R_S C_S}, \omega_{p1} = \frac{1 + \frac{g_m R_S}{2}}{R_S C_S}, \omega_{p2} = \frac{1}{R_D C_p},$$

wherein w$_z$ is a zero frequency, w$_{p1}$ is a low-frequency pole (dominant pole) and w$_{p2}$ is a high-frequency pole (non-dominant pole).

Accordingly, the DC gain of the CTLE circuit 300 can equal $$\frac{g_m R_D}{1 + g_m R_S/2},$$

and the ideal peak gain of the CTLE circuit 300 can equal g$_m$R$_D$ (R$_S$=0). Further, ideal peaking of the CTLE circuit 300 can equal $$\frac{\text{ideal peak gain}}{\text{DC gain}} = \frac{\omega_{p1}}{\omega_z} = 1 + g_m R_S/2.$$

As mentioned above, a limitation of the conventional CTLE circuit 300 is that the AC gain cannot surpass the DC gain and amplification at higher frequencies is diminished (e.g., AC amplification is diminished at frequencies that surpass the w$_{p2}$ high-frequency pole (non-dominant pole)). For example, at frequencies that surpass the w$_{p2}$, the frequency gain could be −20 db/decade. The value of the source resistor R$_S$ 326 can be adjusted to obtain different peak gains. Further, for simulation purposes, the DC gain can be determined by setting the value of the source resistor R$_S$ 326 to 0 ohms. In the CTLE circuit 300 the maximum AC gain can only reach the gain that is achieved by setting the value of the source resistor R$_S$ 326 to 0 ohms and (as described above) the AC gain diminishes at frequencies above the w$_{p2}$.

Figure 4:
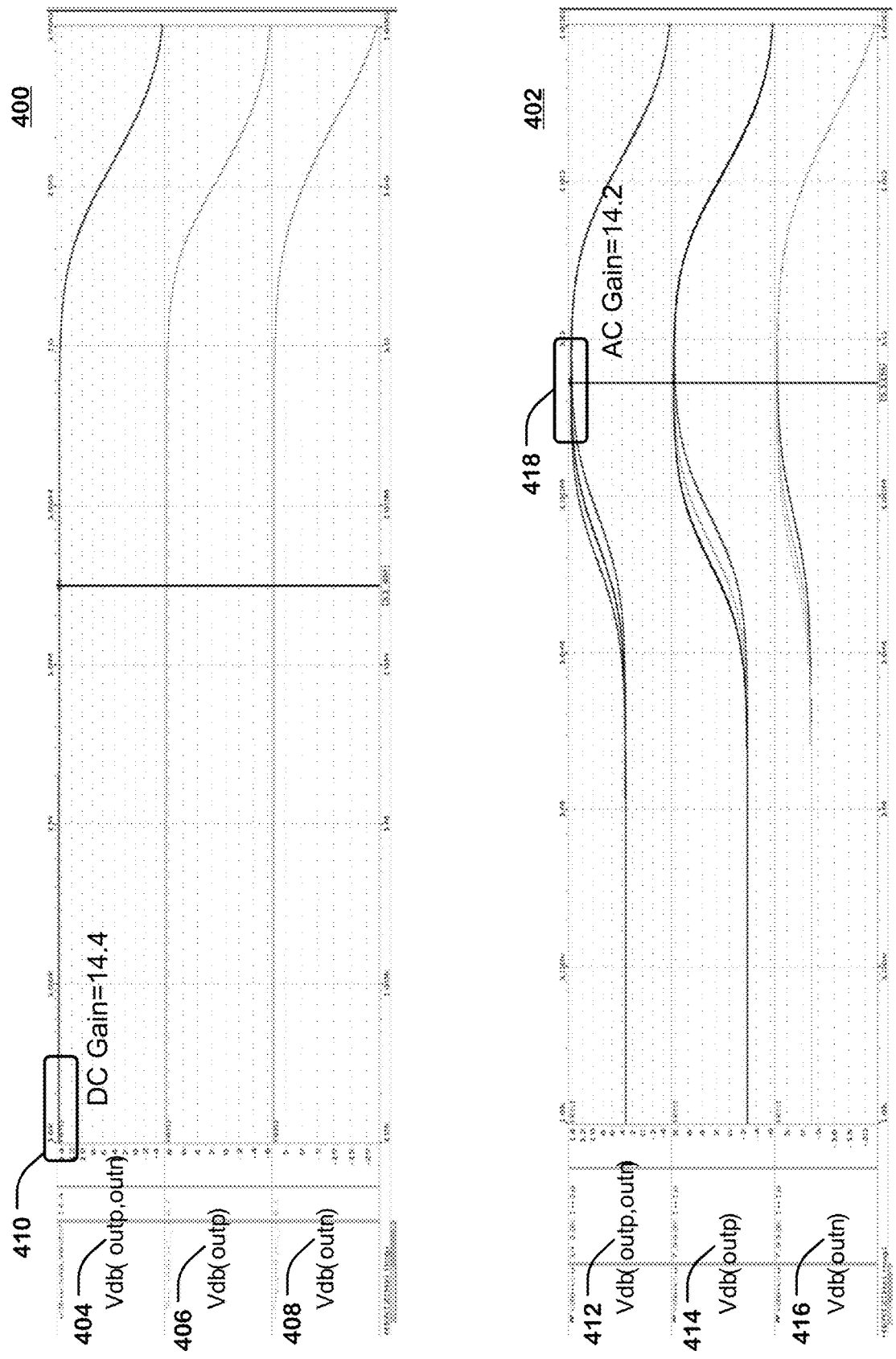
FIG. 4 is a dB (gain) vs. frequency diagram illustrating DC gain and AC gain achieved by a conventional CTLE circuit.

FIG. 4 is a dB (gain) vs. frequency diagram illustrating DC gain and AC gain achieved by a conventional CTLE circuit.

Specifically, FIG. 4 illustrates a diagram 400 showing dB (gain) vs. frequency for a simulation representing DC gain and illustrates a diagram 402 showing dB (gain) vs. frequency representing AC gain. As explained above with reference to FIG. 3, the DC gain can be determined by setting the value of the source resistor R$_S$ 326 to 0 ohms. As illustrated in diagram 400, the differential V$_{db}$ signal 404 resulting from a combination of V$_{db}$ 406 and V$_{db}$ 408 provides a maximum DC gain 410 of about 14.4 dB, where the gain begins to diminish above 1 Ghz.

Further, as illustrated in diagram 402, the differential V$_{db}$ signal 412 resulting from a combination of V$_{db}$ 414 and V$_{db}$ 416 provides a maximum AC gain 418 of about 14.2 dB, which is less than the maximum DC gain 410 of about 14.4 dB, where the gain peaks around 500 Mhz.

Accordingly, there is a need for an improved CTLE circuit that is able to provide an AC gain that is higher than the DC gain, which cannot be achieved by the conventional CTLE circuit 300.

Figure 5:
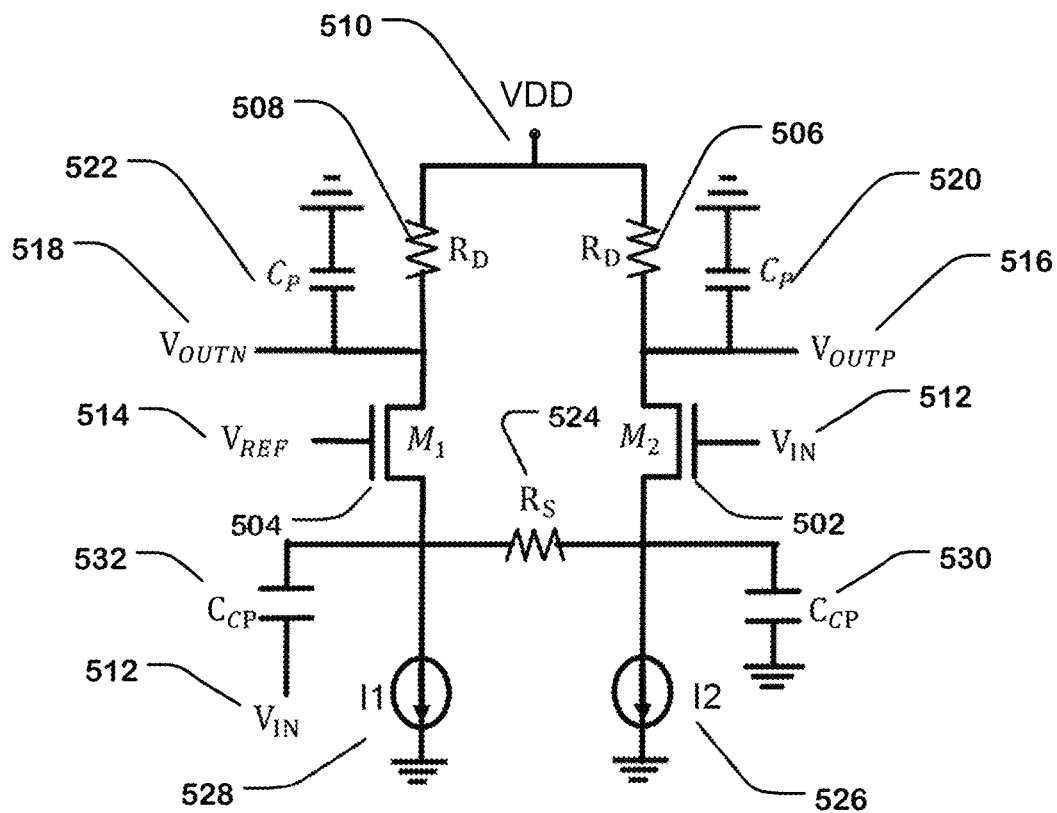
FIG. 5 is a circuit diagram of an example of a CTLE circuit according to the technology disclosed.

FIG. 5 is a circuit diagram of an example of a CTLE circuit according to the technology disclosed.

Specifically, FIG. 5 illustrates a CTLE circuit 500 that includes two charge coupling capacitors C$_{CP}$ 530 and 532. Before describing the coupling capacitors C$_{CP}$ 530 and 532, other portions of the CTLE circuit will be described.

This improved CTLE circuit 500 includes a differential pair of transistors, including a first M$_1$ transistor 504 and a second M$_2$ transistor 502. The first M$_1$ transistor 504 and the second M$_2$ transistor 502 are illustrated as MOSFET n-channel transistors. However, they can also be other types of transistors such as MOSFET p-channel transistors, JFET n- or p-channel transistors or any other type of transistors known to those skilled in the art.

As illustrated, a drain of the first M$_1$ transistor 504 is connected to a drain resistor R$_D$ 508. In a similar manner, a drain of the second M$_2$ transistor 502 is connected to a drain resistor R$_D$ 506. Typically, the drain resistor R$_D$ 508 and the drain resistor R$_D$ 506 have a same resistance value, but they can be different from one another. Both the drain resistor R$_D$ 508 and the drain resistor R$_D$ 506 are connected to a drain-side supply voltage node 510 that supplies a voltage of VDD. The drain resistors R$_D$ 508 and 506 can be variable resistors.

A gate of the second M$_2$ transistor 502 is connected to V$_{IN}$ 512, which is a (single ended) voltage input signal (or input voltage) for which continuous time liner equalization is to be applied by the CTLE circuit 500. The input voltage signal can typically have values ranging from tens of mVs to hundreds of mVs at frequencies ranging from 1 GHz to 10 GHz (although lower frequency operations can be implemented). A gate of the first M$_1$ transistor 504 is connected to V$_{REF}$ 514, which is a reference voltage. In an example, V$_{REF}$ 514 can have different values depending on whether a CTT or an LTT is implemented. More specifically, for example, for a CTT implementation, V$_{REF}$ 514 can be VCCQ divided by 2 and for an LTT implementation, V$_{REF}$ 514 can be VCCQ divided by 3.

The differential pair of transistors can provide a differential output signal (output voltage) including V$_{OUTP}$ 516, which can be a positive portion of the differential output signal and including V$_{OUTN}$ 518, which can be a negative portion of the differential output signal. Therefore, this CTLE circuit 500 provides a differential output signal (output voltage) from a single-ended voltage input signal (voltage input) to compensate for channel loss. V$_{OUTP}$ 516 is connected to the drain of the M$_2$ transistor 502 (between the drain resistor R$_D$ 506 and the drain of the M$_2$ transistor 502).

A capacitor $C_P$ 520 is also connected between the drain of the $M_2$ transistor 502 and ground. Similarly, $V_{OUTN}$ 518 is connected to the drain of the $M_1$ transistor 504 (between the drain resistor $R_D$ 508 and the drain of the $M_1$ transistor 504). A capacitor CP 522 is also connected between the drain of the $M_1$ transistor 504 and ground.

A current I2 526, such as a biasing current is applied to a source of the $M_2$ transistor 502 and a current I1 528, such as a biasing current is applied to a source of the $M_1$ transistor 504. The biasing current of I2 526 can be the same as or different from the biasing current of I1 528. Rather than using two current sources, such as current I2 526 and current I1 528, as single (biasing) current can be applied to the sources of both the $M_1$ transistor 504 and the $M_2$ transistor 502. The sources of both the $M_1$ transistor 504 and the $M_2$ transistor 502 are connected to a source resistor $R_S$ 524.

A difference between the conventional CTLE circuit 300 and the CTLE circuit 500, is that the CTLE circuit 500 does not include the source capacitor $C_S$ 328, but rather includes the two coupling capacitors $C_{CP}$ 530 and 532. The coupling capacitor $C_{CP}$ 532 is connected between $V_{IN}$ 512 and the source of the $M_1$ transistor 504 and in series with the source resistor $R_S$ 524. The coupling capacitor $C_{CP}$ 530 is connected between ground and the source of the $M_2$ transistor 502 and in series with the source resistor $R_S$ 524. The two coupling capacitors $C_{CP}$ 530 and 532 can have the same or similar capacitance values, can be selected to provide similar or different frequency responses within the CTLE circuit and can be selected to provide specific or similar electrical characteristics. The zero-pole ("zero") frequency can be calculated as $$\omega_Z = \frac{1}{R_S C_{CP}}.$$

The coupling capacitors $C_{CP}$ 530 and 532 and the source resistor $R_S$ 524 can essentially form an RC element that inserts a zero in the frequency response of the circuit that enhances amplification of higher frequencies compared to lower frequencies, to compensate for the channel loss, wherein the "zero" can be moved around by adjusting the values of the coupling capacitors $C_{CP}$ 530 and 532 and the source resistor $R_S$ 524.

When the input voltage $V_{IN}$ 512 surpasses a frequency threshold (which is dictated, in part, by the values of the coupling capacitors $C_{CP}$ 530 and 532), the first $M_1$ transistor 504 operates in the common gate mode and the differential output voltages $V_{OUTN}$ 518 and $V_{OUTP}$ 516 provides an AC gain that is greater than a DC gain of the CTLE circuit 500. Input voltages to place the first $M_1$ transistor 504 into a common gate mode will be apparent to those skilled in the art. When $V_{IN}$ 512 is at a high enough frequency, coupling capacitors $C_{CP}$ 530 and 532 act as a "short," which will put $M_1$ transistor 504 in the common gate stage at the zero frequency ($W_Z$). In other words, when $V_{IN}$ 512 is a low frequency signal (e.g., a DC signal), the coupling capacitors $C_{CP}$ 530 and 532 can act as an "open circuit," such that $V_{IN}$ 512 does not couple to the reference side of the CTLE circuit 500, but when $V_{IN}$ 512 is a sufficiently high frequency, $V_{IN}$ 512 does couple to the reference side, where the capacitor impedance of the coupling capacitor $C_{CP}$ 532 (for example) is $$Z_C = \frac{1}{jwC}.$$

Based on the desired implementation, the frequency at which AC peak gain is achieved can be adjusted by changing the values of the coupling capacitors $C_{CP}$ 530 and 532. For example, a higher value for the coupling capacitors $C_{CP}$ 530 and 532 will result is a lower frequency at which AC peak gain is achieved and a lower value for the coupling capacitors $C_{CP}$ 530 and 532 will result in a higher frequency at which AC peak gain is achieved. For further example, the peak AC gain can be calculated as $(g_m*R_D)+(g_m*R_D)$, where $g_m$ can be from, for example, $M_1$ transistor 504. In other words, the peak AC gain can be $(2*g_m*R_D)$. As discussed above, the DC gain of the CTLE circuit 500 can be obtained by setting the value of the source resistor $R_S$ 524 to 0 ohms. The DC gain can be calculated as $gmR_D/(1+gmR_S/2)$.

The coupling capacitors $C_{CP}$ 530 and 532 can be one of a metal-oxide-semiconductor capacitor (MOSCAP), a metal-insulator-metal capacitor (MIMCAP) and a multi-layer ceramic capacitor (MLCC) or any other type of capacitor available to those of skill in the art.

Figure 6:
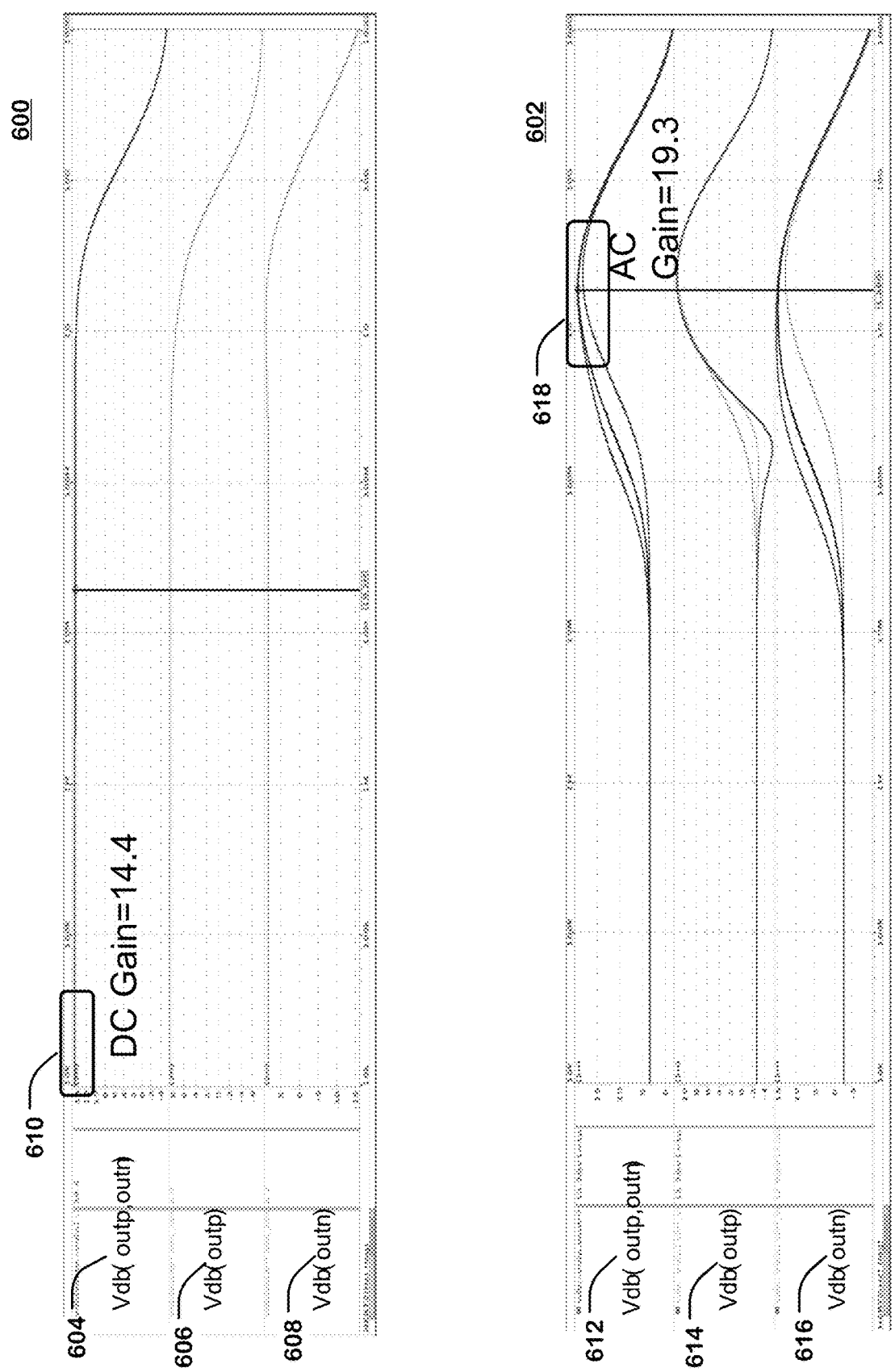
FIG. 6 is a dB (gain) vs. frequency diagram illustrating DC gain and AC gain achieved by the CTLE circuit of the technology disclosed.

FIG. 6 is a dB (gain) vs. frequency diagram illustrating DC gain and AC gain achieved by the CTLE circuit according to the technology disclosed.

Specifically, FIG. 6 illustrates a diagram 600 showing dB (gain) vs. frequency for a simulation representing DC gain and illustrates a diagram 602 showing dB (gain) vs. frequency representing AC gain. DC gain can be determined by setting the value of the source resistor $R_S$ 524 to 0 ohms. As illustrated in diagram 600, the differential $V_{db}$ signal 604 resulting from a combination of $V_{db}$ 606 and $V_{db}$ 608 provides a maximum DC gain 610 of about 14.4 dB, where the gain begins to diminish above 1 Ghz.

Further, as illustrated in diagram 602, the differential $V_{db}$ signal 612 resulting from a combination of $V_{db}$ 614 and $V_{db}$ 616 provides a maximum AC gain 618 of about 19.3 dB, which is greater than the DC gain 610 of 14.4 dB, where the gain peaks just above 1 Ghz. The CTLE circuit 500 can thus achieve an AC gain that is greater than the DC gain, which cannot be achieved by a conventional CTLE circuit.

Figure 7:
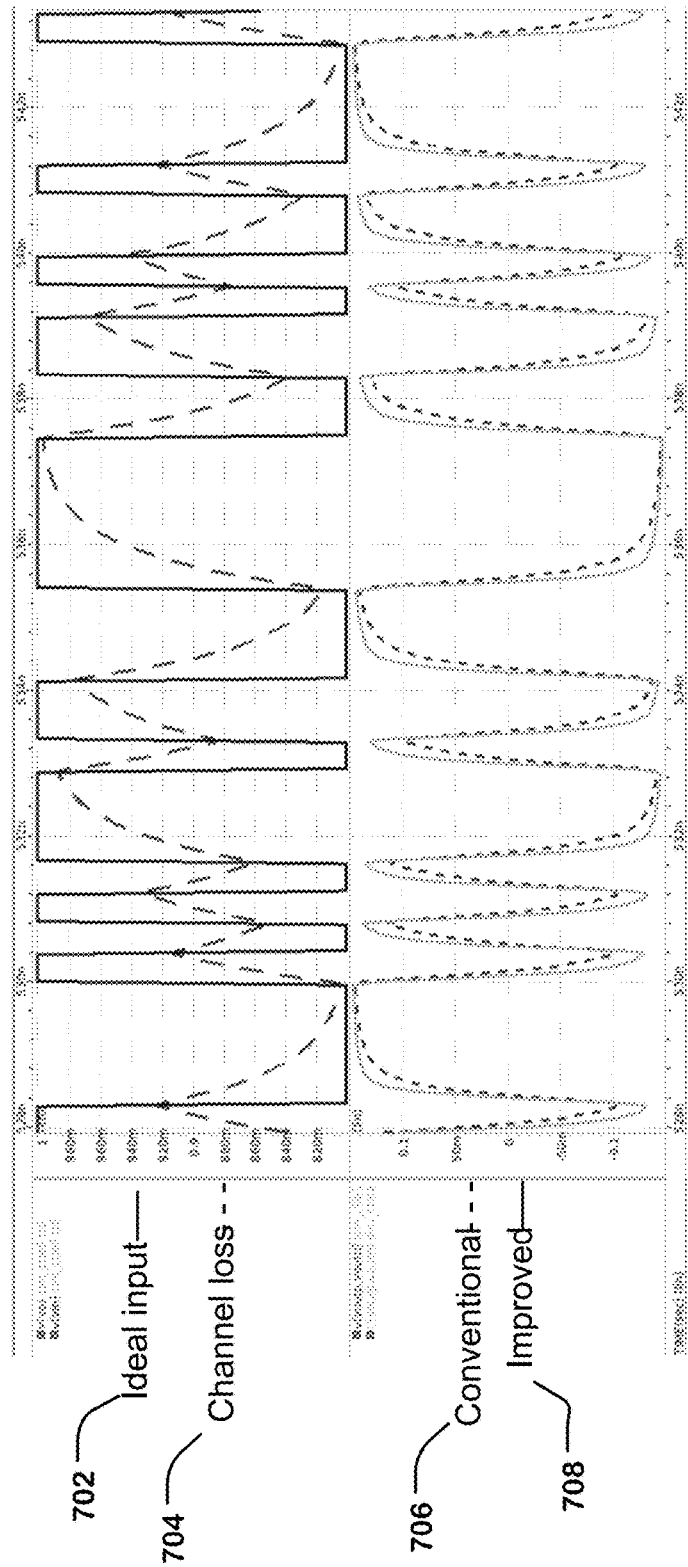
FIG. 7 illustrates an ideal input, channel loss, a result from applying the channel loss signal to a conventional CTLE circuit and a result from applying the channel loss signal to a CTLE circuit according to the technology disclosed.

FIG. 7 illustrates an ideal input, channel loss, a result from applying the channel loss signal to a conventional CTLE circuit and a result from applying the channel loss signal to a CTLE circuit according to the technology disclosed.

Specifically, FIG. 7 illustrates a diagram 700 that includes an ideal input signal 702, and a channel loss signal 704 resulting in channel loss to the ideal input signal 702. As can be seen, the high and low values of the channel loss signal 704 are not ideal, which can result in incorrect or reduced frequencies.

The diagram 700 of FIG. 7 further illustrates an output signal 706 resulting from the use of the conventional CTLE circuit 300 to correct for the channel loss. The diagram 700 also illustrates an improved output signal 708 that is provided by the improved CTLE circuit 500. As illustrated, the transient time and the amplitudes of the improved output signal 708 are much better than the transient time and the amplitudes of the output signal 706 from the conventional CTLE circuit 300.

Figure 8:
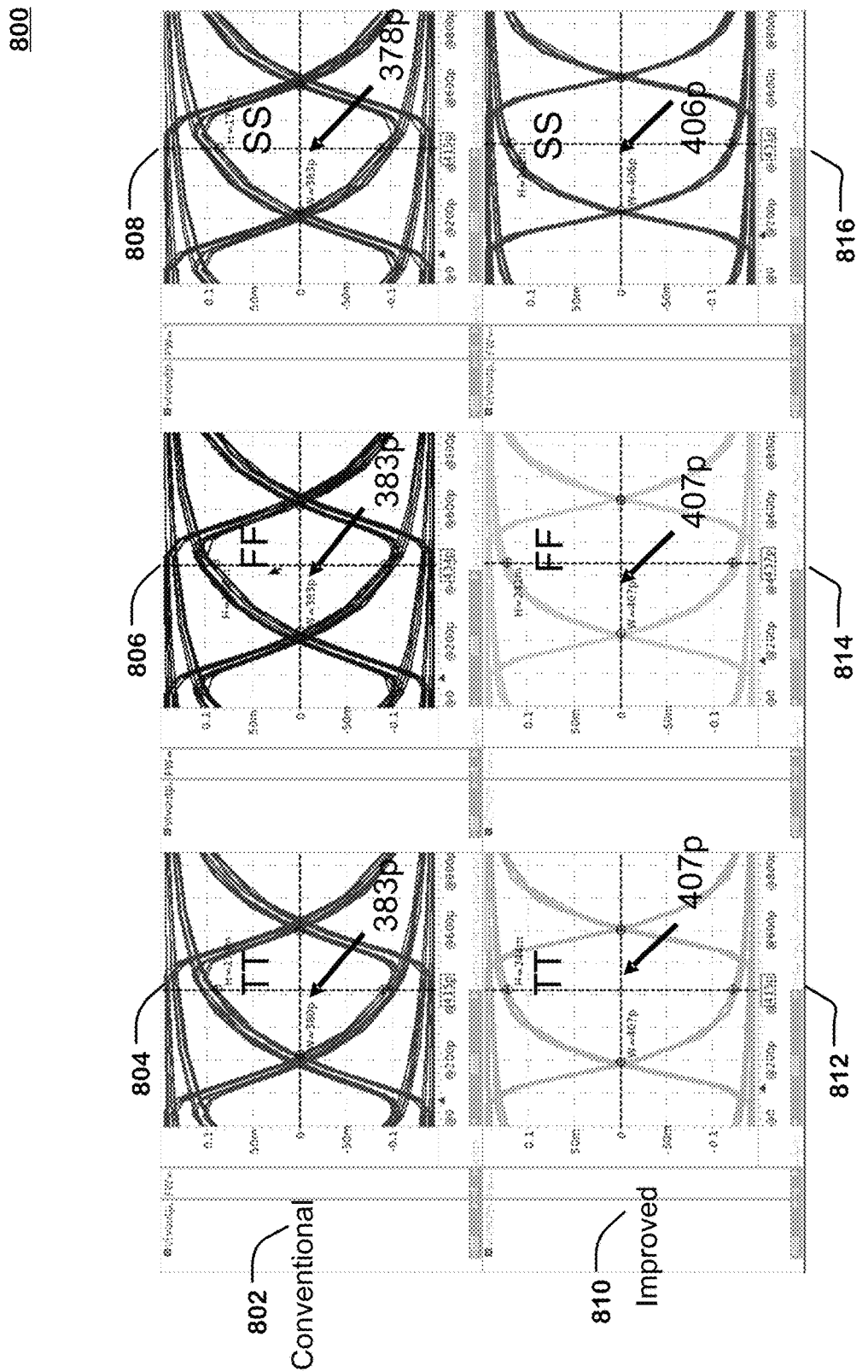
FIG. 8 illustrates a process corners eye graph for both a conventional CTLE circuit and a CTLE circuit according to the technology disclosed.

FIG. 8 illustrates a process corners eye graph for both a conventional CTLE circuit and a CTLE circuit according to the technology disclosed.

Specifically, FIG. 8 illustrates a diagram 800 that provides eye graphs for both the conventional CTLE circuit 300 and the improved CTLE circuit 500 for various process corners, such as typical-typical (TT), fast-fast (FF) and slow-slow (SS). As illustrated, the upper row 802 of the diagram 800 provides eye graphs for the TT corner 804, the FF corner 806 and the SS corner 808, and the lower row 810 of the diagram 800 provides eye graphs for the TT corner 812, the FF corner 814 and the SS corner 816. In this example, the input data rate was 2.4 Gb/s. As illustrated in each of the TT corner 804, the FF corner 806 and the SS corner 808 there is significant variation between signals, when compared to the variation between signals in the TT corner 812, the FF corner 814 and the SS corner 816.

Further, the width of TT corner 804 is 383 ps, the height of TT corner 804 is 179 mV, the width of FF corner 806 is 383 ps, the height of FF corner 806 is 180 mV, the width of SS corner 808 is 378 ps and the height of SS corner 808 is 176 mV. The width of TT corner 812 is 407 ps, the height of TT corner 812 is 244 mV, the width of FF corner 814 is 407 ps, the height of FF corner 814 is 241 mV, the width of SS corner 816 is 406 ps and the height of SS corner 816 is 242 mV. As illustrated, the widths of the improved CTLE circuit 500 having a range from 406 ps to 407 ps is better than the widths of the conventional CTLE circuit 300 having a range from 378 ps to 383 ps. Further, the high frequency AC gain (and DC gain) of the improved CTLE circuit 500, which is exemplified by the heights of 241 mV to 244 mV, is better than the high frequency AC gain (and DC gain) of the conventional CTLE circuit 300, which is exemplified by the heights of 176 mV to 180 mV.

Figure 9:
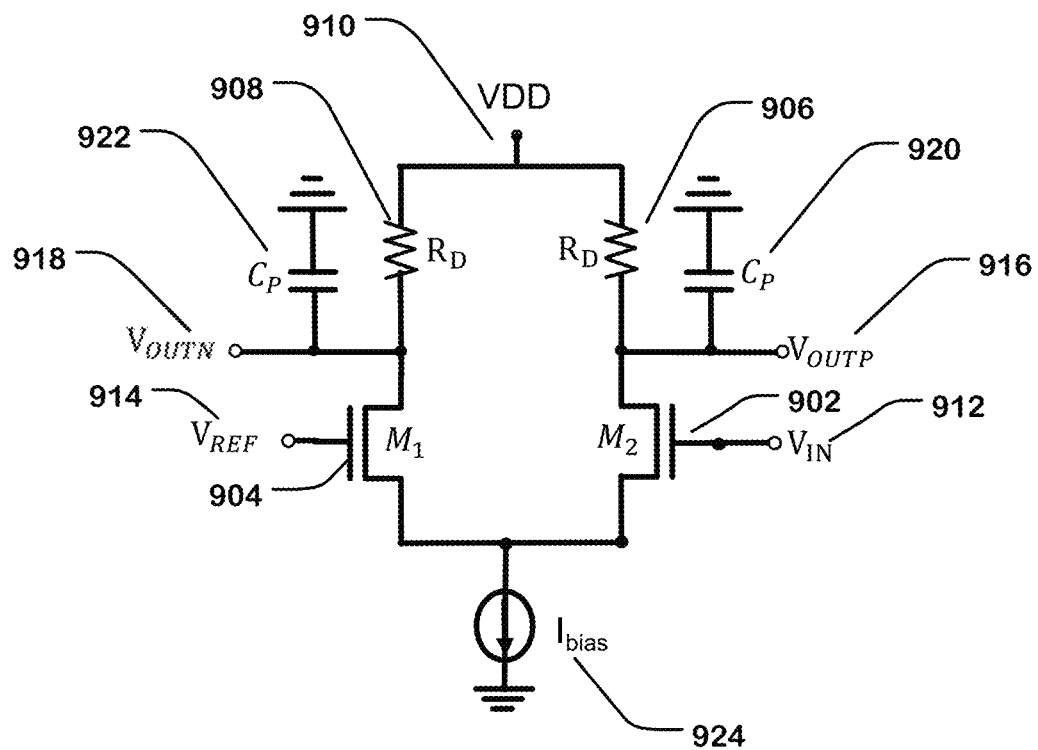
FIG. 9 illustrates an input buffer that receives a single ended input signal and outputs a differential output signal.

FIG. 9 illustrates an input buffer that receives a single ended input signal and outputs a differential output signal.

Specifically, FIG. 9 illustrates an input buffer circuit 900 that can receive an input signal (e.g., an ideal pulse, small signal pulse, small swing signal, etc.). This input buffer circuit 900 includes a differential pair of transistors, including a first $M_1$ transistor 904 and a second $M_2$ transistor 902. The first $M_1$ transistor 904 and the second $M_2$ transistor 902 are illustrated as MOSFET n-channel transistors. However, they can also be other types of transistors such as MOSFET p-channel transistors, JFET n- or p-channel transistors or any other type of transistors known to those skilled in the art.

As illustrated, a drain of the first $M_1$ transistor 904 is connected to a drain resistor $R_D$ 908. In a similar manner, a drain of the second $M_2$ transistor 902 is connected to a drain resistor $R_D$ 906. Typically, the drain resistor $R_D$ 908 and the drain resistor $R_D$ 906 have a same resistance value, but they can be different from one another. Both the drain resistor $R_D$ 908 and the drain resistor $R_D$ 906 are connected to a drain-side supply voltage node 910 that supplies a voltage of VDD.

A gate of the second $M_2$ transistor 902 is connected to $V_{IN}$ 912, which is a (single ended) voltage input signal (or input voltage) for which signal amplification is to be applied by the input buffer circuit 900. The input voltage signal can typically have values ranging from tens of mVs to hundreds of mVs at frequencies ranging from hundreds of megahertz (MHz) to several GHz (in an example, the frequencies can be less than that received by CTLE circuits). A gate of the first $M_1$ transistor 904 is connected to $V_{REF}$ 914, which is a reference voltage. In an example, $V_{REF}$ 914 can have different values depending on whether a CTT or an LTT is implemented. More specifically, for example, for a CTT implementation, $V_{REF}$ 914 can be VCCQ divided by 2 and for an LTT implementation, $V_{REF}$ 914 can be VCCQ divided by 3.

The differential pair of transistors can provide a differential output signal (output voltage) including $V_{OUTP}$ 916, which can be a positive portion of the differential output signal and including $V_{OUTN}$ 918, which can be a negative portion of the differential output signal. Therefore, this input buffer circuit 900 provides a differential output signal (output voltage) from a single-ended voltage input signal (voltage input). The output voltage can be provided to a next stage amplifier or a receiver circuit, for example. $V_{OUTP}$ 916 is connected to the drain of the $M_2$ transistor 902 (between the drain resistor $R_D$ 906 and the drain of the $M_2$ transistor 902). A capacitor $C_P$ 920 is also connected between the drain of the $M_2$ transistor 902 and ground. Similarly, $V_{OUTN}$ 918 is connected to the drain of the $M_1$ transistor 904 (between the drain resistor $R_D$ 908 and the drain of the $M_1$ transistor 904). A capacitor $C_P$ 922 is also connected between the drain of the $M_1$ transistor 904 and ground.

A current $I_{bias}$ 924 is applied to a source of the $M_2$ transistor 902 as well as a source of the $M_1$ transistor 904. The input buffer circuit 900 is able to amplify the $V_{IN}$ 912 signal to provide a differential voltage output signal as $V_{OUTP}$ 916 and $V_{OUTN}$ 918 that has an increased amplitude for certain frequencies. However, this input buffer circuit 900 is limited in the sense that at higher frequencies, the amplification is diminished and at higher frequencies the voltage output signals $V_{OUTP}$ 916 and $V_{OUTN}$ 918 are not balanced. For example, when the input buffer circuit 900 receives an input that is near the gigahertz range, the $V_{OUTP}$ 916 and $V_{OUTN}$ 918 will become unbalanced and cause eye diagram loss (discussed below). Because the $I_{bias}$ 924 can have an effect of parasitic capacitance, it can affect a speed at which the $V_{IN}$ 912 is transmitted to $V_{OUTP}$ 916 and $V_{OUTN}$ 918, resulting in (high-speed) operation distortion. More specifically, when $V_{IN}$ 902 changes, the source nodes of $M_1$ transistor 904 and $M_2$ transistor 902 will also change (e.g., in a same direction). Therefore, when $V_{IN}$ 902 rises, the source node will also rise to a certain voltage (e.g., when the frequency is not too fast), because the VGS of $M_2$ transistor 902 increases, $V_{OUTP}$ 916 will decrease, and the VGS of $M_1$ transistor 904 will decrease so that $V_{OUTN}$ 918 will increase, and vice versa if $V_{IN}$ 902 decreases. However, if the frequency is high enough (e.g., in the gigahertz range), the source side responses of $M_1$ transistor 904 and $M_2$ transistor 902 will be affected by the parasitic capacitance, and the response will be slow, which will lead to an unbalanced response between $V_{OUTP}$ 916 and $V_{OUTN}$ 918

Figure 10:
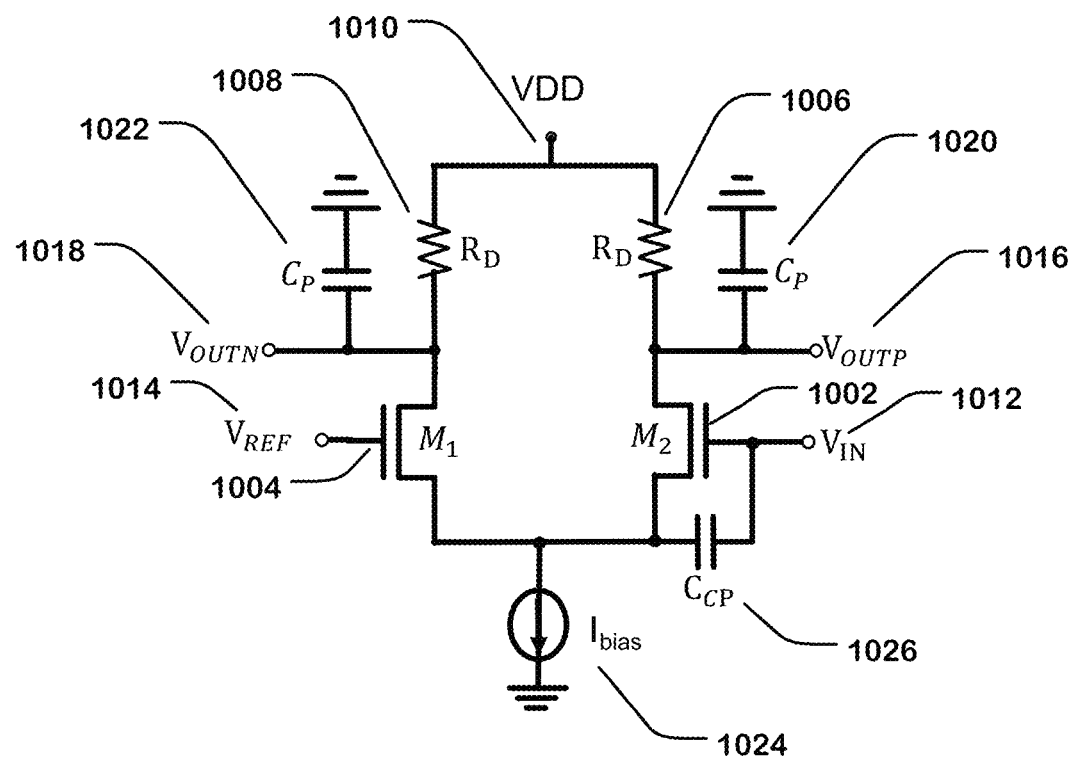
FIG. 10 illustrates an input buffer including a coupling capacitor that receives a single ended input signal and outputs a differential output signal according to the technology disclosed.

FIG. 10 illustrates an input buffer including a coupling capacitor that receives a single ended input signal and outputs a differential output signal according to the technology disclosed.

Specifically, FIG. 10 illustrates an improved input buffer circuit 1000 that includes a coupling capacitor that can receive an input signal (e.g., an ideal pulse, small signal pulse, small swing signal, etc.). This input buffer circuit 1000 includes a differential pair of transistors, including a first $M_1$ transistor 1004 and a second $M_2$ transistor 1002. The first $M_1$ transistor 1004 and the second $M_2$ transistor 1002 are illustrated as MOSFET n-channel transistors. However, they can also be other types of transistors such as MOSFET p-channel transistors, JFET n- or p-channel transistors or any other type of transistors known to those skilled in the art.

As illustrated, a drain of the first $M_1$ transistor 1004 is connected to a drain resistor $R_D$ 1008. In a similar manner, a drain of the second $M_2$ transistor 1002 is connected to a drain resistor $R_D$ 1006. Typically, the drain resistor $R_D$ 1008 and the drain resistor $R_D$ 1006 have a same resistance value, but they can be different from one another. Both the drain resistor $R_D$ 1008 and the drain resistor $R_D$ 1006 are connected to a drain-side supply voltage node 1010 that supplies a voltage of VDD.

A gate of the second $M_2$ transistor 1002 is connected to $V_{IN}$ 1012, which is a (single ended) voltage input signal (or input voltage) for which signal amplification is to be applied by the input buffer circuit 1000. The input voltage signal can typically have values ranging from tens of mVs to hundreds of mVs at frequencies ranging from hundreds of megahertz (MHz) to several GHz (in an example, the frequencies can be less than that received by CTLE circuits). A gate of the first $M_1$ transistor 1004 is connected to $V_{REF}$ 1014, which is a reference voltage. In an example, $V_{REF}$ 1014 can have different values depending on whether a CTT or an LTT is implemented. More specifically, for example, for a CTT implementation, $V_{REF}$ 1014 can be VCCQ divided by 2 and for an LTT implementation, $V_{REF}$ 1014 can be VCCQ divided by 3.

The differential pair of transistors can provide a differential output signal (output voltage) including $V_{OUTP}$ 1016, which can be a positive portion of the differential output signal and including $V_{OUTN}$ 1018, which can be a negative portion of the differential output signal. Therefore, this input buffer circuit 1000 provides a differential output signal (output voltage) from a single-ended voltage input signal (voltage input). The output voltage can be provided to a next stage amplifier or a receiver circuit, for example. $V_{OUTP}$ 1016 is connected to the drain of the $M_2$ transistor 1002 (between the drain resistor $R_D$ 1006 and the drain of the $M_2$ transistor 1002). A capacitor $C_P$ 1020 is also connected between the drain of the $M_2$ transistor 1002 and ground. Similarly, $V_{OUTN}$ 1018 is connected to the drain of the $M_1$ transistor 1004 (between the drain resistor $R_D$ 1008 and the drain of the $M_1$ transistor 1004). A capacitor $C_P$ 1022 is also connected between the drain of the $M_1$ transistor 1004 and ground.

A current $I_{bias}$ 1024 is applied to a source of the $M_2$ transistor 1002 as well as a source of the $M_1$ transistor 1004. A coupling capacitor $C_{CP}$ 1026 is connected between the gate and the source of the $M_2$ transistor 1002, such that the coupling capacitor $C_{CP}$ 1026 receives $V_{IN}$ 1012 as it is applied to the gate of the $M_2$ transistor 1002. The coupling capacitor $C_{CP}$ 1026 can be one of a metal-oxide-semiconductor capacitor (MOSCAP), a metal-insulator-metal capacitor (MIMCAP) and a multi-layer ceramic capacitor (MLCC), or any other type of capacitor available to those of skill in the art.

The coupling capacitor $C_{CP}$ 1026 provides a benefit, such that as $V_{IN}$ 1012 increases in frequency the coupling capacitor $C_{CP}$ 1026 acts as a short to the drain of the $M_2$ transistor 1002 and puts the $M_2$ transistor 1002 into a common gate mode, which will increase the AC gain applied to $V_{IN}$ 1012. Additionally, this input buffer circuit 1000 provides a benefit of an input buffer circuit that has a more balanced differential outputs ($V_{OUTN}$ 1018 and $V_{OUTP}$ 1016) at higher frequencies, which cannot be achieved by the input buffer circuit 900. For example, as described above with reference to FIG. 9, the input buffer circuit 900 provides an unbalanced response between $V_{OUTP}$ 916 and $V_{OUTN}$ 918 at higher frequencies (e.g., frequencies in the gigahertz range). The input buffer circuit 900 and the input buffer circuit 1000 can have the same or similar AD and DC gains, but the input buffer circuit 1000 can provide a more balanced output than the input buffer circuit 900.

The use of the $C_{CP}$ 1026 can compensate the source for the $M_1$ transistor 1004 and $M_2$ transistor 1002 responses when operating at sufficiently high frequencies (e.g., frequencies in the low gigahertz range and/or high megahertz range). The parasitic capacitance effect of $I_{bias}$ 1024 can be compensated by the $C_{CP}$ 1026 so that the input $V_{IN}$ 1026 response at high frequency is more balanced (i.e., $V_{OUTP}$ 1016 and $V_{OUTN}$ 1018 are more balanced) as opposed to the differential output of the input buffer circuit 900, resulting in an eye diagram that is closer to the ideal pulse width.

Accordingly, the input buffer circuit 1000 is able to amplify the $V_{IN}$ 1012 signal and provide a differential voltage output signal as $V_{OUTP}$ 1016 and $V_{OUTN}$ 1018 that has an increased amplitude for certain frequencies with better balance.

Figure 11:
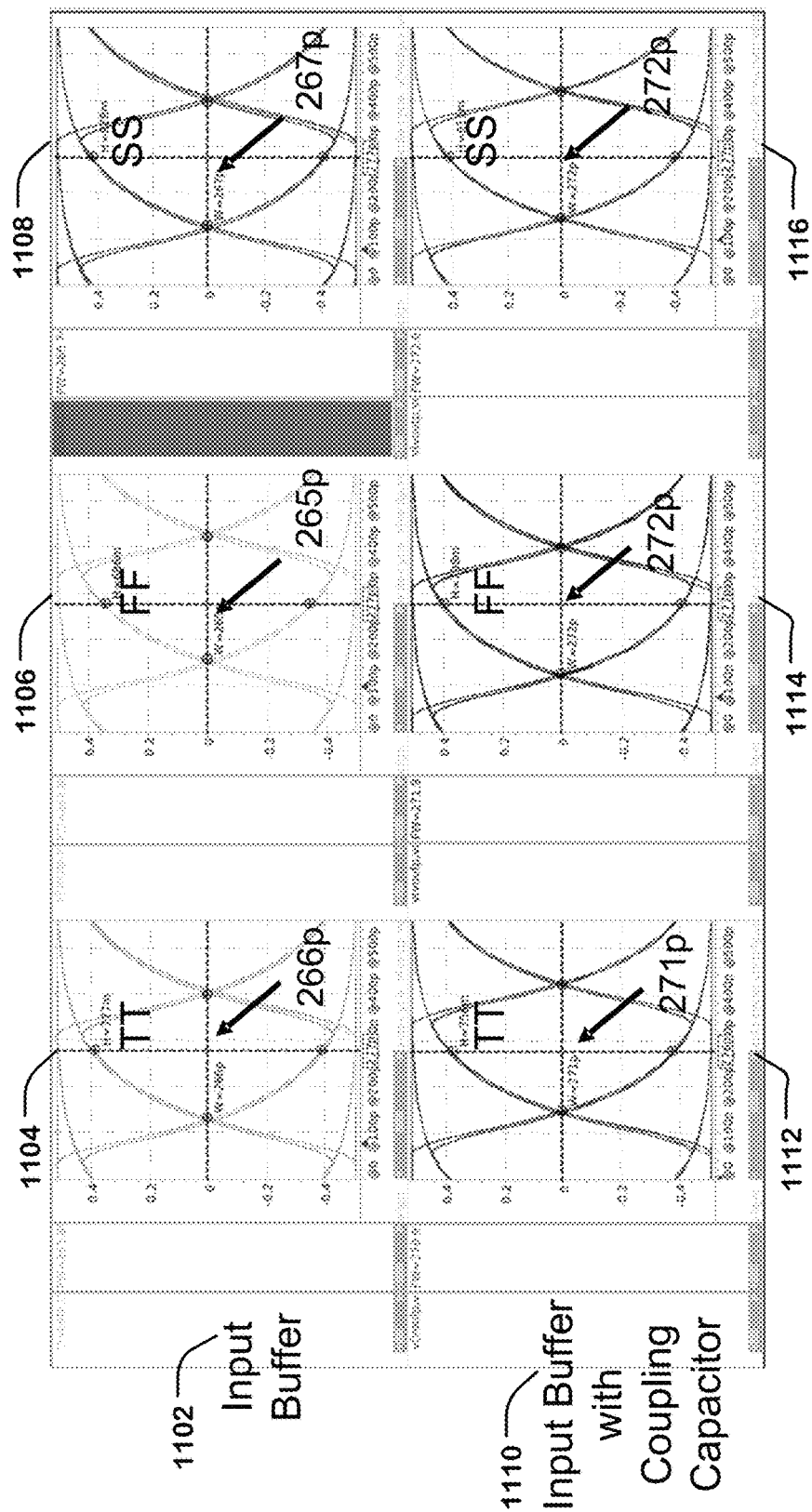
FIG. 11 illustrates a process corners eye graph for both an input buffer and an input buffer with a coupling capacitor according to the technology disclosed.

FIG. 11 illustrates a process corners eye graph for both an input buffer and an input buffer with a coupling capacitor according to the technology disclosed.

Specifically, FIG. 11 illustrates a diagram 1100 that provides eye graphs for both the input buffer circuit 900 without a coupling capacitor and the input buffer circuit 1000 with the coupling capacitor for various process corners, such as typical-typical (TT), fast-fast (FF) and slow-slow (SS). FIG. 11 illustrates that the input buffer circuit 1000 provides a more balanced effect with an input data rate for the eye chart at 3.6 Gb/s and a pulse width of about 277.7 ps with minimal to no channel loss As illustrated, the upper row 1102 of the diagram 1100 provides eye graphs for the TT corner 1104, the FF corner 1106 and the SS corner 1108, and the lower row 1110 of the diagram 1100 provides eye graphs for the TT corner 1112, the FF corner 1114 and the SS corner 1116. As illustrated in each of the TT corner 1104, the FF corner 1106 and the SS corner 1108 there is significant more variation between signals, when compared to the variation between signals in the TT corner 1112, the FF corner 1114 and the SS corner 1116 corresponding to the input buffer circuit 1000 with the coupling capacitor.

Further, the width of TT corner 1104 is 266 ps, the height of TT corner 1104 is 777 mV, the width of FF corner 1106 is 265 ps, the height of FF corner 1106 is 686 mV, the width of SS corner 1108 is 267 ps and the height of SS corner 1108 is 828 mV. The width of TT corner 1112 is 271 ps, the height of TT corner 1112 is 756 mV, the width of FF corner 1114 is 272 ps, the height of FF corner 1114 is 798 mV, the width of SS corner 1116 is 272 ps and the height of SS corner 1116 is 818 mV. As illustrated, the widths of the input buffer circuit 1000 (row 1110) with the coupling capacitor having a range from 271 ps to 272 ps is better than the widths of the input buffer circuit 900 (row 1102) having a range from 265 ps to 267 ps.

Figure 12:
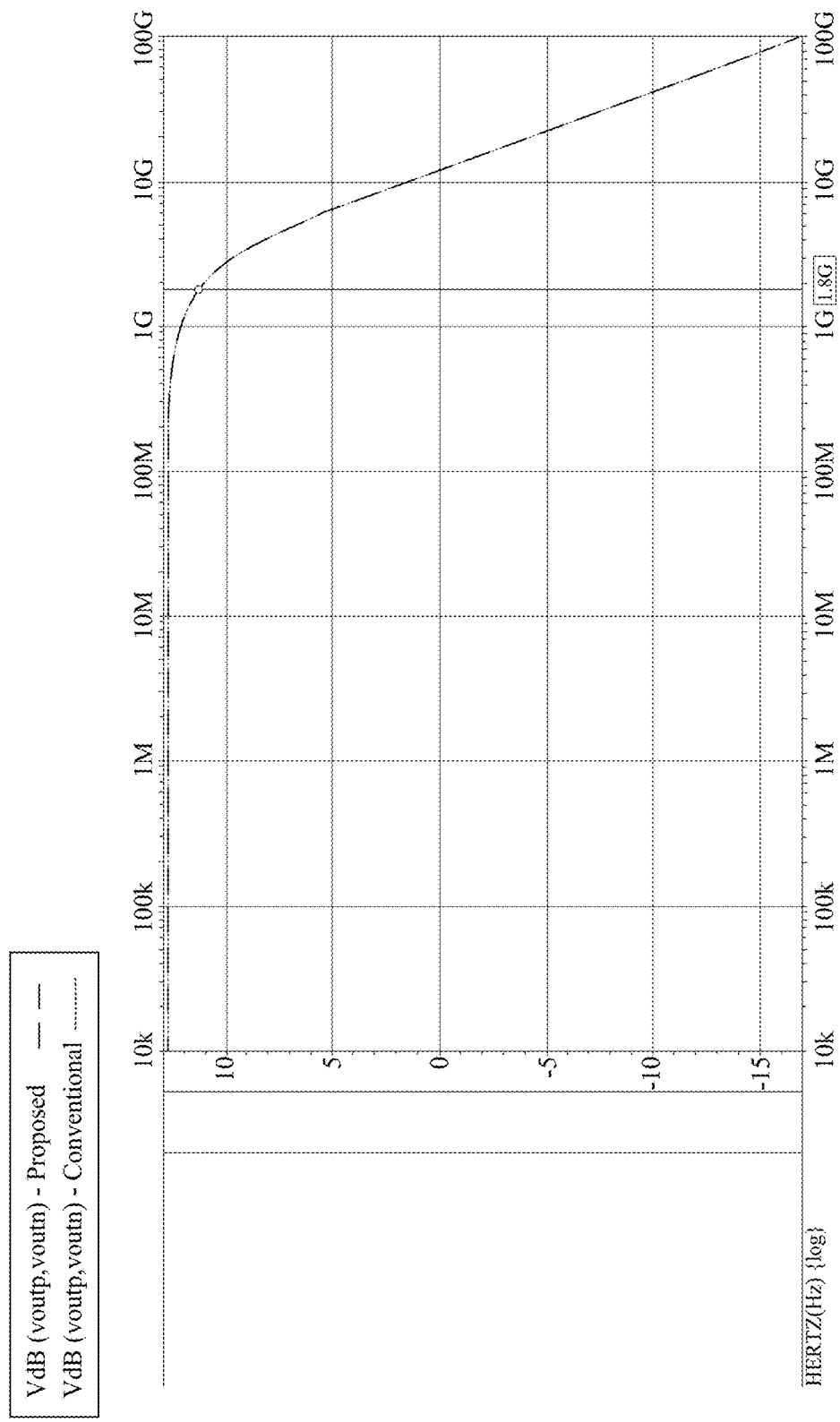
FIG. 12 is a dB (gain) vs. frequency diagram illustrating a differential output (voutp, voutn) of a simulation of the input buffer of FIG. 9 and the input buffer of FIG. 10 that includes a coupling capacitor.

FIG. 12 is a dB (gain) vs. frequency diagram illustrating a differential output (voutp, voutn) of a simulation of the input buffer of FIG. 9 and the input buffer of FIG. 10 that includes a coupling capacitor.

Specifically, FIG. 12 illustrates a dB (gain) vs. frequency diagram 1200 of (i) a conventional input buffer circuit, such as the input buffer circuit 900, and (ii) a proposed input buffer circuit, such as the input buffer circuit 1000 (in response to a particular AC input). The diagram 1200 illustrates the differential outputs (combination of voutp and voutn) of, for example, the input buffer circuit 900 and the input buffer circuit 1000. As illustrated the differential outputs of both circuits are very similar, if not identical. In other words, the AC gain for both the input buffer circuits 900 and 1000 are very similar, if not identical. However, as discussed below in more detail, the output of the input buffer circuit 1000 is more balanced than the output of the input buffer circuit 900.

Figure 13:
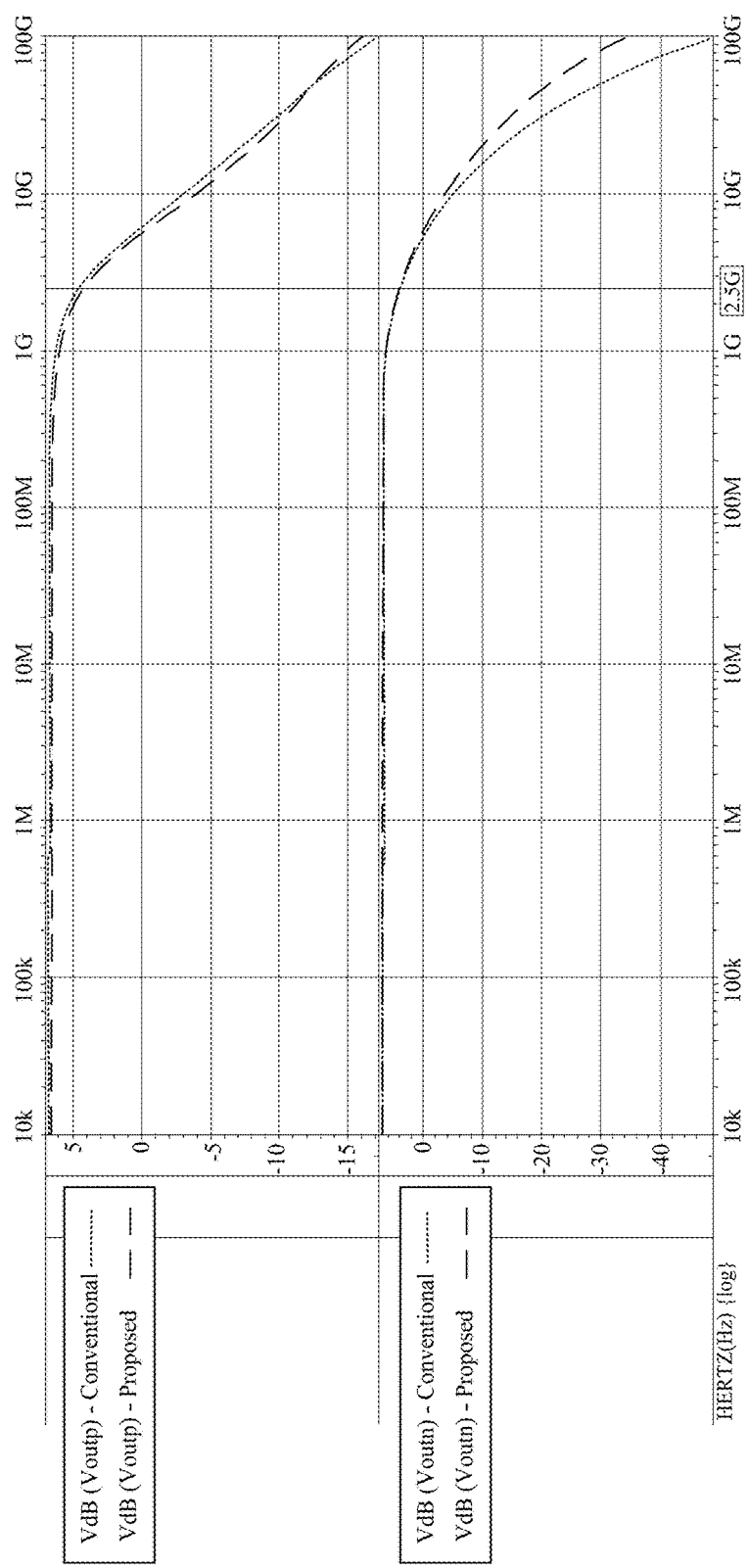
FIG. 13 is a dB (gain) vs. frequency diagram illustrating individual positive (Voutp) and negative (Voutn) output signals of a simulation of the input buffer of FIG. 9 and the input buffer of FIG. 10 that includes a coupling capacitor.

FIG. 13 is a dB (gain) vs. frequency diagram illustrating individual positive (Voutp) and negative (Voutn) output signals of a simulation of the input buffer of FIG. 9 and the input buffer of FIG. 10 that includes a coupling capacitor.

Specifically, the top graph of FIG. 13 illustrates a dB (gain) vs. frequency diagram 1300 of (i) a positive component output (Voutp) of a conventional input buffer circuit, such as the input buffer circuit 900 and (ii) a positive component output (Voutp) of a proposed input buffer circuit, such as the input buffer circuit 1000 (in response to the same particular AC input referred to in FIG. 12). As illustrated in FIG. 13, even though the differential outputs of both circuits are the same (as explained above with reference to FIG. 12), the Voutp of, for example, the input buffer circuit 900, is different from the Voutp of, for example the input buffer circuit 1000. The Voutp of the (conventional) input buffer circuit 900 is illustrated by a solid line and the Voutp of the (proposed) input buffer circuit 1000 is illustrated by a dashed line.

Additionally, the bottom graph of FIG. 13 illustrates a dB (gain) vs. frequency diagram 1300 of (i) a negative component output (Voutn) of a conventional input buffer circuit, such as the input buffer circuit 900 and (ii) a negative component output (Voutn) of a proposed input buffer circuit, such as the input buffer circuit 1000 (in response to the same particular AC input referred to in FIG. 12). As illustrated in FIG. 13, even though the differential outputs of both circuits are the same (as explained above with reference to FIG. 12), the Voutn of, for example, the input buffer circuit 900, is different from the Voutn of, for example the input buffer circuit 1000. The Voutn of the (conventional) input buffer circuit 900 is illustrated by a solid line and the Voutp of the (proposed) input buffer circuit 1000 is illustrated by a dashed line.

Figure 14:
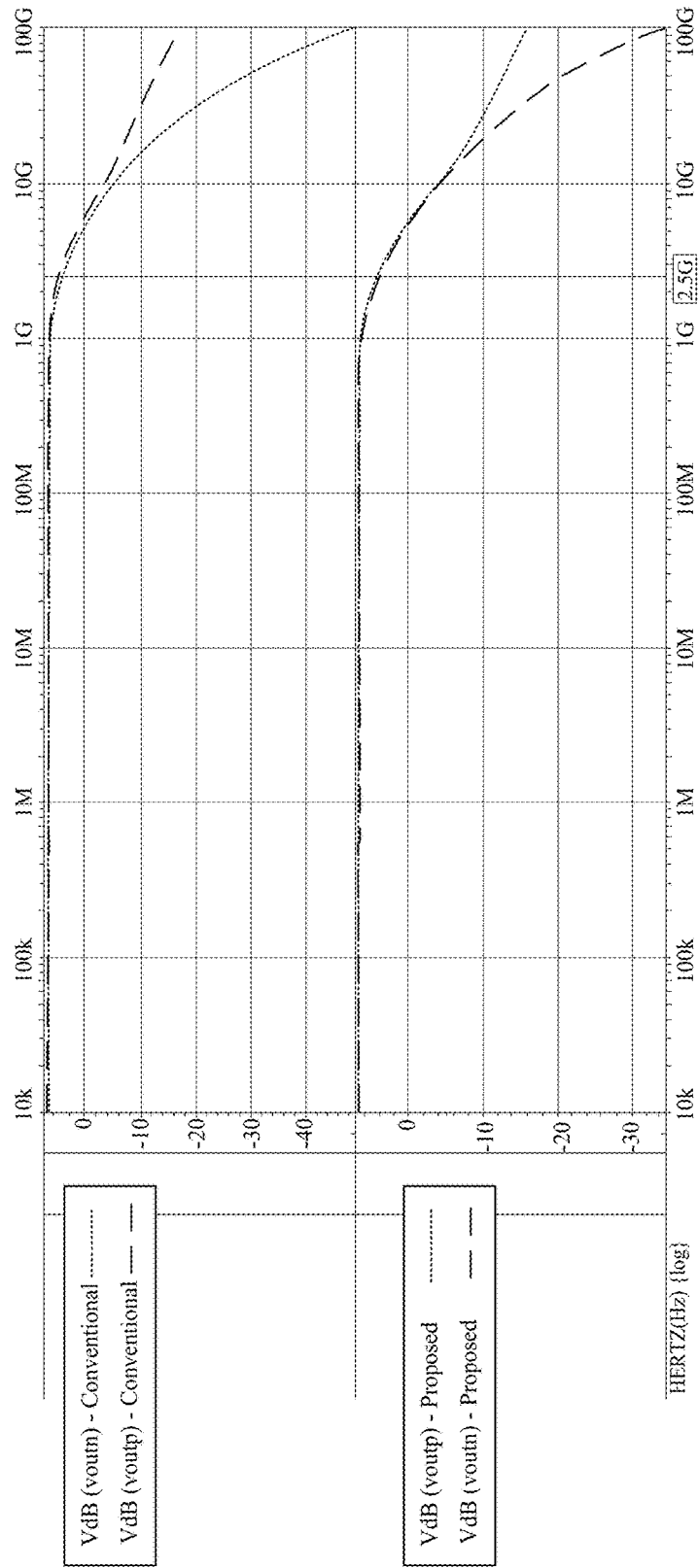
FIG. 14 is a dB (gain) vs. frequency diagram illustrating individual positive (voutp) and negative (voutn) output signals of a simulation of the input buffer of FIG. 9 and the input buffer of FIG. 10 that includes a coupling capacitor.

FIG. 14 is a dB (gain) vs. frequency diagram illustrating individual positive (voutp) and negative (voutn) output signals of a simulation of the input buffer of FIG. 9 and the input buffer of FIG. 10 that includes a coupling capacitor.

Specifically, the top graph of FIG. 14 illustrates a dB (gain) vs. frequency diagram 1400 of (i) a positive component output (voutp) of a conventional input buffer circuit, such as the input buffer circuit 900 and (ii) a negative component output (voutn) of a proposed input buffer circuit, such as the input buffer circuit 900 (in response to the same particular AC input referred to in FIG. 12). As illustrated in FIG. 14, the voutn and the voutp of the input buffer circuit 900 become very unbalanced at higher frequencies.

Additionally, the bottom graph of FIG. 14 illustrates a dB (gain) vs. frequency diagram 1400 of (i) a negative component output (voutn) of a proposed input buffer circuit, such as the input buffer circuit 1000 and (ii) a positive component output (voutp) of a proposed input buffer circuit, such as the input buffer circuit 1000 (in response to the same particular AC input referred to in FIG. 12). As illustrated in FIG. 14, the voutn and the voutp of the input buffer circuit 1000 are more balanced at higher frequencies than the voutn and the voutp of the input buffer circuit 900.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A continuous time linear equalizer (CTLE) circuit, comprising:
    a differential pair of first and second transistors, the first and second transistors having drains connected through first and second drain resistors to a drain-side supply voltage node, and sources connected together by a source resistor and connected to one or more current sources, the first transistor in the differential pair having a gate connected to a reference voltage, and the second transistor in the differential pair having a gate connected to an input voltage, the drains of the first and second transistors providing a differential pair of signals as an output voltage;
    a first coupling capacitor connected between the source of the first transistor and the input voltage; and
    a second coupling capacitor connected to the source of the second transistor.

2. The CTLE circuit of claim 1, wherein the second coupling capacitor is connected between the source of the second transistor and ground.

3. The CTLE circuit of claim 1, further comprising a first drain-side capacitor connected between the drain of the first transistor and ground.

4. The CTLE circuit of claim 3, further comprising a second drain-side capacitor connected between the drain of the second transistor and ground.

5. The CTLE circuit of claim 1, wherein the source of the first transistor is connected to a first current source providing a first biasing current.

6. The CTLE circuit of claim 5, wherein the source of the second transistor is connected to a second current source providing a second biasing current that is the same as or different from the first biasing current.

7. The CTLE circuit of claim 1, wherein a first differential output voltage of the differential pair is provided from the drain of the first transistor.

8. The CTLE circuit of claim 7, wherein a second differential output voltage of the differential pair is provided from the drain of the second transistor and wherein the first differential output voltage is a negative voltage component of the differential pair and the second differential output voltage is a positive voltage component of the differential pair.

9. The CTLE circuit of claim 7, wherein, when the input voltage surpasses a frequency threshold, the first transistor operates in a common gate mode and the first differential output voltage provides an alternating current (AC) gain that is greater than a direct current (DC) gain of the CTLE circuit.

10. The CTLE circuit of claim 9, wherein the DC gain is determined by setting a value of the source resistor to 0 ohms.

11. The CTLE circuit of claim 1, wherein an amplifier architecture of the CTLE circuit is a two-stage operational amplifier.

12. The CTLE circuit of claim 1, wherein an amplifier architecture of the CTLE circuit is a fold-cascade architecture.

13. The CTLE circuit of claim 1, wherein the first and second coupling capacitors are one of a metal-oxide-semiconductor capacitor (MOSCAP), a metal-insulator-metal capacitor (MIMCAP) and a multi-layer ceramic capacitor (MLCC).

14. A memory device including the CTLE circuit of claim 1 as a receiver circuit.

15. The memory device of claim 14, wherein the memory is one of static random access memory (SRAM), NAND flash memory, NOR flash memory, resistive random access memory (RRAM), magnetoresistive random access memory (MRAM) and phase change random access memory (PCRAM).

16. An input buffer circuit, comprising:
    a differential pair of first and second transistors, the first and second transistors having drains connected through first and second drain resistors to a drain-side supply voltage node, and sources connected to a current source, the first transistor in the differential pair having a gate connected to a reference voltage, and the second transistor in the differential pair having a gate connected to an input voltage; and a coupling capacitor connected between the source of the second transistor and the input voltage.

17. The input buffer circuit of claim 16, further comprising a first drain-side capacitor connected between the drain of the first transistor and ground.

18. The input buffer circuit of claim 16, further comprising a second drain-side capacitor connected between the drain of the second transistor and ground.

19. The input buffer circuit of claim 16, wherein current source, which is connected to the source of the first transistor and the source of the second transistor, provides a biasing current.

20. The input buffer circuit of claim 16, wherein a first differential output voltage of the differential pair is provided from the drain of the first transistor and a second differential output voltage of the differential pair is provided from the drain of the second transistor.

* * * * *